US007671298B2

(12) United States Patent
Doi et al.

(10) Patent No.: US 7,671,298 B2
(45) Date of Patent: Mar. 2, 2010

(54) HEATING LINE PATTERN STRUCTURE OF DEFOGGER FORMED ON REAR WINDOW GLASS PANEL OF MOTOR VEHICLE AND REAR GLASS PANEL

(75) Inventors: Ryokichi Doi, Minato-ku (JP); Hiroshi Iijima, Minato-ku (JP); Kazuo Takayama, Kobe (JP); Kouichi Chikaishi, Kobe (JP)

(73) Assignee: Fujitsu Ten Limited, Hyogo (JP)

(*) Notice: Subject to any disclaimer, the term of this patent is extended or adjusted under 35 U.S.C. 154(b) by 393 days.

(21) Appl. No.: 11/579,749

(22) PCT Filed: Jun. 29, 2005

(86) PCT No.: PCT/JP2005/011990

§ 371 (c)(1),
(2), (4) Date: Nov. 8, 2006

(87) PCT Pub. No.: WO2006/001486

PCT Pub. Date: Jan. 5, 2006

(65) Prior Publication Data

US 2007/0241088 A1 Oct. 18, 2007

(30) Foreign Application Priority Data

Jun. 29, 2004 (JP) ............................ 2004-191129

(51) Int. Cl.
*B60L 1/02* (2006.01)
*H01Q 1/02* (2006.01)

(52) U.S. Cl. ........................ 219/203; 219/202; 219/219; 219/218; 343/704; 343/711; 343/713; 343/712; 343/720; 343/722; 343/749

(58) Field of Classification Search ............. 219/202-3, 219/218-9; 343/704, 711, 713, 712, 720, 343/722, 749
See application file for complete search history.

(56) References Cited

U.S. PATENT DOCUMENTS 4,095,228 A 6/1978 Meinke et al.

(Continued)

FOREIGN PATENT DOCUMENTS

EP 0 942 486 9/1999

(Continued)

OTHER PUBLICATIONS

Supplementary European Search Report corresponding to application No. EP 05 75 5617 dated Dec. 10, 2007.

(Continued)

*Primary Examiner*—Shawntina Fuqua
(74) *Attorney, Agent, or Firm*—RatnerPrestia

(57) ABSTRACT

A heating line pattern structure is provided, in which the effect of the heating lines of a defogger on an antenna for a TV broadcast especially for a digital TV broadcast may be decreased. The defogger is structured by arranging heating lines between bus bars on both sides. The portion of an uppermost heating line in proximity to the monopole antenna are folded rectangularly at a regular interval to form a meander shape. One lateral heating line is extended under the meander-shaped heating line portion, and is connected to a vertical heating line to which four lateral heating lines are connected together.

14 Claims, 12 Drawing Sheets

U.S. PATENT DOCUMENTS

| | | | | |
|---|---|---|---|---|
| 5,097,270 | A * | 3/1992 | Lindenmeier et al. | 343/704 |
| 5,646,637 | A | 7/1997 | Miller | |
| 5,801,663 | A | 9/1998 | Lindenmeier et al. | |
| 7,211,768 | B2 | 5/2007 | Yamashita et al. | |

FOREIGN PATENT DOCUMENTS

| | | | |
|---|---|---|---|
| JP | 57-140255 | | 8/1982 |
| JP | S57-140255 | A | 8/1982 |
| JP | 8-222930 | A | 8/1996 |
| JP | 9-326610 | A | 12/1997 |
| JP | 2004-72736 | A | 3/2004 |

OTHER PUBLICATIONS

International Search Report dated Oct. 4, 2005.

* cited by examiner

F/G. 1
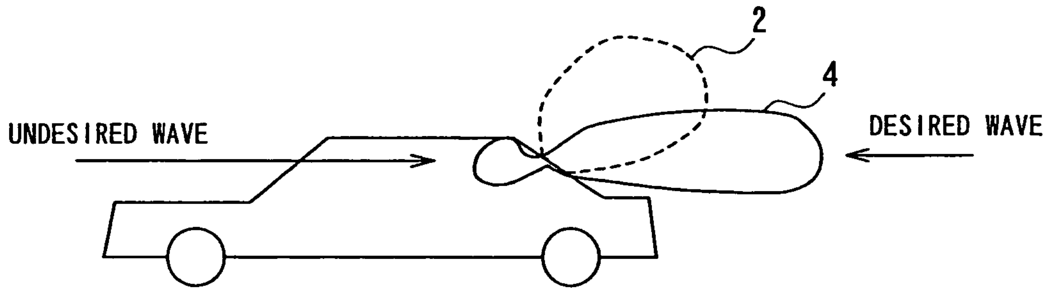
F/G. 2
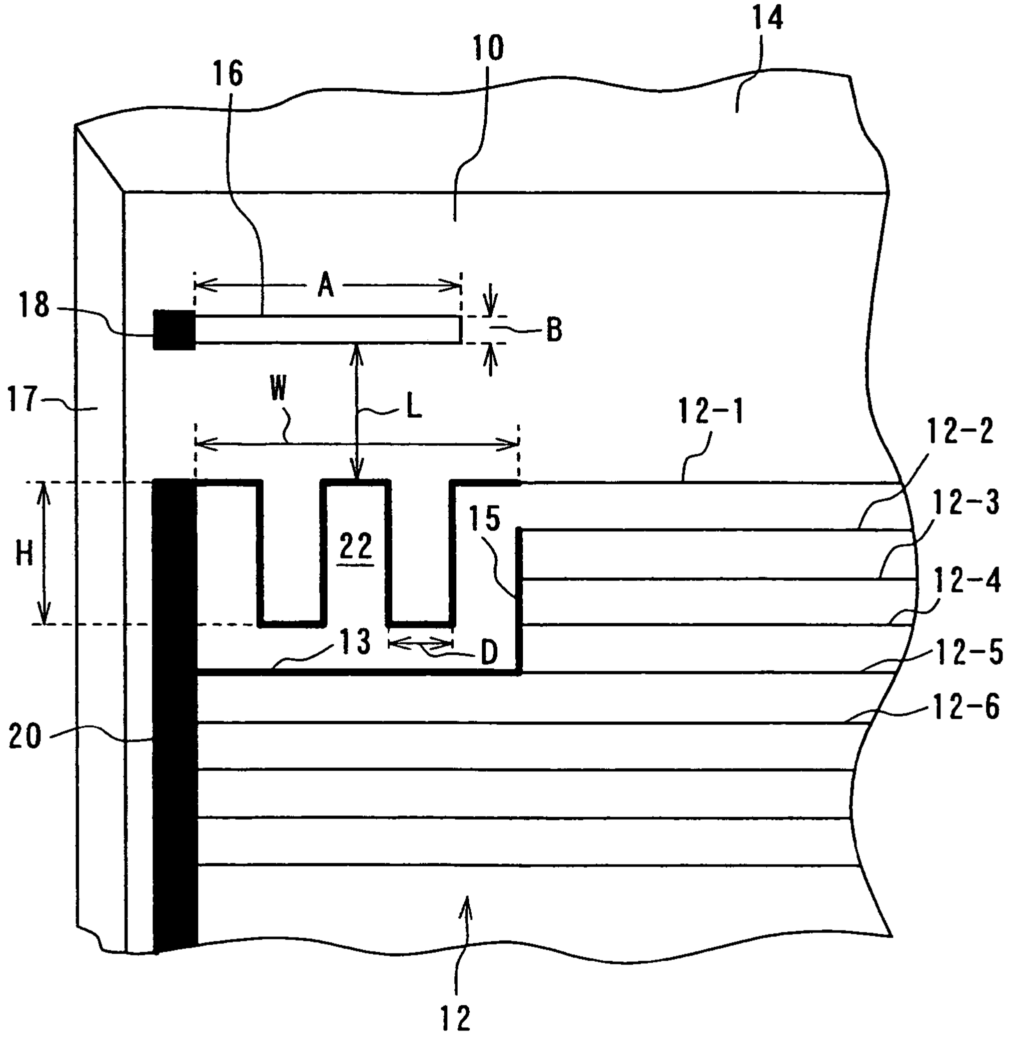

HEATING LINE PATTERN STRUCTURE OF DEFOGGER FORMED ON REAR WINDOW GLASS PANEL OF MOTOR VEHICLE AND REAR GLASS PANEL

TECHNICAL FIELD

The present invention relates to a structure of a defogger formed on a rear window glass panel of a motor vehicle and a rear window glass panel, particularly to a heating line pattern structure of a defogger formed on a window glass panel on which an antenna is provided and a rear window glass panel.

BACKGROUND ART

In an antenna for a TV (television) broadcasting particularly for a terrestrial digital TV broadcasting (470-710 MHz) formed on a rear glass window glass panel, characteristics for improving the picture quality of a TV are required by controlling the directivity toward a desired wave to suppress the interference with an undesired wave coming from the direction other than toward the desired wave. In particular, a reception performance is reduced due to the Doppler shift when a motor vehicle runs at a high speed, so that the sensitivity difference between the desired and undesired waves, i.e. an F/B (front/back) ratio, is required by 10 dB or more.

For this requirement, it has been known in Japanese Patent Publication No. 2002-135025, for example, that a directional antenna comprising a reflector and director may be effectively used. It has also been known in Japanese Patent Publication No. 2003-283405 that the directivity may be realized by functioning the roof (metal) of a motor vehicle as a reflector.

In the case that a conventional antenna is provided on a rear window glass panel having heating lines, various problems are caused. For example, the controlling of the directivity toward a desired wave becomes difficult due to the effect of the heating lines, resulting in the difficulty in obtaining a desired F/B ratio. This is due to the fact that the directivity of an antenna on a rear window glass panel is varied in a vertical direction with respect to the surface of a rear window glass panel as shown in FIG. 1 by the dotted-line 2 to decrease the sensitivity of the antenna in a horizontal direction. The reference numeral 4 shows the directivity of the antenna in the case that there are no heating lines on the panel.

Even if a reflector and director which are both parasitic elements are used, the control of the directivity toward a desired wave is difficult due to the effect of the heating lines.

DISCLOSURE OF THE INVENTION

An object of the present invention is to provide a heating line pattern structure such that the effect of the heating lines of a defogger on an antenna, particularly an antenna for a TV broadcasting (especially for a digital TV broadcasting) may be decreased.

Another object of the present invention is to provide a rear glass antenna panel comprising an antenna and a defogger which includes said heating line patterns.

In accordance with the present invention, a heating line pattern structure of a defogger formed opposing to an antenna provided on a rear window glass panel of a motor vehicle is characterized in that at least one heating line in proximity to the antenna has a meander shape.

In a first aspect of the heating line structure, the portion of the heating line having a meander shape is opposed to the antenna. The portion opposing to the antenna has a meander shape in this manner, so that the effect of the meander-shaped portion to the antenna is decreased due to the facts that the distance between the heating line of the meander-shaped portion and the antenna is substantially becomes large and the meander-shaped portion has a high impedance in high frequency. In a second aspect of the heating line structure, the at least one heating line comprises a linear-shaped portion opposing to the antenna and meander-shaped portion on one or both side(s) of the linear-shaped portion. As described above, the meander-shaped portion has a high impedance in high frequency, so that the linear-shaped portion opposing to the antenna functions as a director, resulting in the improvement of the antenna directivity.

Also, in accordance with the present invention, a rear window glass panel of a motor vehicle comprises an antenna provided on the rear window glass panel, and a defogger formed on the rear window glass panel, opposing to the antenna, the defogger including the heating line pattern structure in which at least one heating line in proximity to the antenna has a meander shape.

BRIEF DESCRIPTION OF DRAWINGS

FIG. 1 shows the condition such that the directivity of an antenna on a rear window glass panel is varied in a vertical direction due to an effect by the heating lines of a defogger.

FIG. 2 shows an embodiment 1 of a heating line pattern structure of a defogger according to the present invention.

BEST MODE FOR CARRYING OUT THE INVENTION

Figure 3:
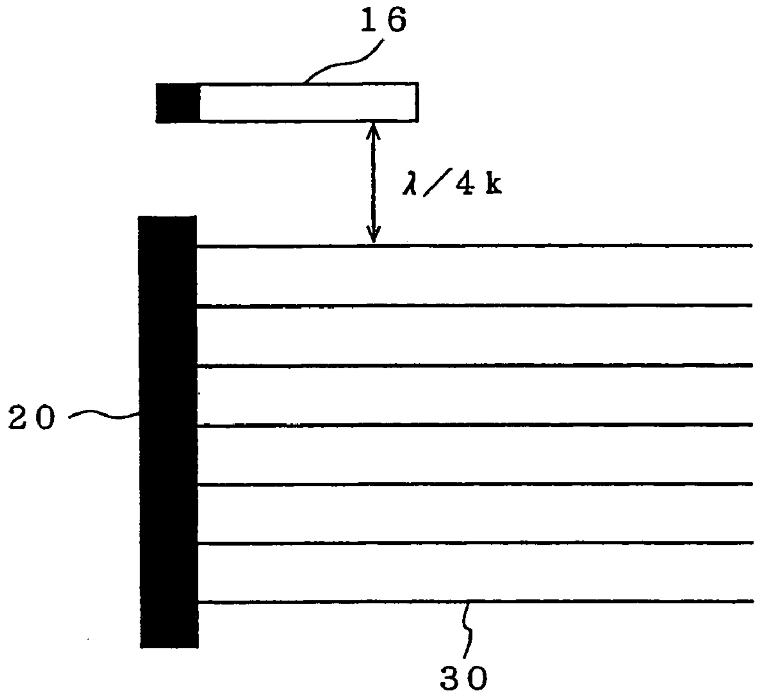
FIG. 3 shows a conventional type of heating line.

Embodiments of the present invention will now be described. It should be noted that λ shows a wavelength of a received wave and k a wavelength-shortening ratio (0.6-0.7 in glass).

Embodiment 1

Referring to FIG. 2, there is shown an embodiment of a heating line pattern structure of a defogger according to the present invention. The heating line pattern of the defogger is symmetrical in right and left, so that only the end portion on left side is shown is the figure for the sake of simplicity. A roof of a body and pillars are also omitted in the figure.

A monopole antenna 16 for a digital TV is provided between a defogger 12 on a rear glass window glass panel 10 of a motor vehicle and a roof 14 of a body, and in proximity to a pillar 17. The monopole antenna may be formed by one linear-shaped antenna, one band-shaped antenna (the width thereof is larger than that of said one linear-shaped antenna), or one loop-shaped antenna consisting of a loop which corresponds the periphery of said band-shaped antenna. In FIG. 2, a loop-shaped monopole antenna is illustrated.

In the case that the wavelength of a received wave (600 MHz) is λ, and the wavelength shortening factor is k, the length A of the monopole antenna 16 is (¼)λk, and the width B thereof is approximately 10 mm. A reference numeral 18 shows a feeding point of the monopole antenna. While the feeding point 18 is positioned opposing to the pillar, it may be positioned opposing to the roof, which secures the same effect as that in the case of the feeding point being positioned opposing to the pillar. Therefore, the feeding point may be positioned opposing to the pillar or roof.

It is noted that the defogger 12 and monopole antenna 16 are formed by silver printed lines, the silver printed lines being fabricated by screen printing silver paste on the glass panel and then firing the printed silver paste.

The defogger 12 is structured by arranging heating lines between bus bars 20 on both sides. The portion of an uppermost heating line 12-1 in proximity to the monopole antenna 16 are folded rectangularly at a regular interval to form a meander shape. The distance L between a meander-shaped heating line portion 22 and the antenna 16 is (¼)λk.

One lateral heating line 13 is extended under the meander-shaped heating line portion 22, and is connected to a vertical heating line 15 to which four lateral heating lines 12-2, 12-3, 12-4 and 12-5 are connected together. The lateral heating line 13 and 12-5 are arranged at the same vertical level. A heating line 12-6 and heating lines arranged under the line 12-6 are conventional ones which are extended between both bus bars.

As the heating line of the meander-shaped portion 22 is zigzagged, the resistance thereof becomes larger than that of a linear heating line. Therefore, the heating line 12-1 including meander-shaped heating lines on both sides has a total resistance larger than that of the conventional heating line 12-6, so that the current through the heating line 12-1 becomes small. As a result of which, Joule heat generated in the heating line 12-1 is small to reduce the effect of defogging. In order to prevent this reduction, the width of the heating line of the meander-shaped portion 22 may be made thick to reduce the resistance thereof. In this case, the width of the heating line of the meander-shaped portion 22 is regulated in such a manner that the defogging effect by the heating line 12 is substantially the same as that by the conventional heating line 12-6. For example, in the case of the width of the heating line 12-1 is 1 mm, the width of the heating line of the meander-shaped portion 22 may preferably be 1-4 mm.

It is also preferable that the width of respective heating lines 13 and 15 is made thick to reduce the resistance thereof, because all of the currents through the four heating lines 12-2, 12-3, 12-4 and 12-5 flow into the heating lines 13 and 15. This is due to the fact that if the width of respective heating lines 13 and 15 is the same as that the conventional heating line, then Joule heat may be increased in the heating lines 13 and 15, resulting in an abnormal heating. Therefore, in the case that the width of the conventional heating line is 1 mm, the width of respective heating lines 13 and 15 is required to be selected in the range of 3-4 mm.

It is assumed that the lateral dimension of the meander-shaped heating line portion 22 is W, the vertical dimension thereof is H, and the dimension of regular interval between vertical heating lines thereof is D. It has been understood by experimental results that the lateral dimension W is preferably in the range of (¼)λk-(½)λk, the vertical dimension H in the range of (⅛)λk-(¼)λk, and the regular interval dimension D in the range of (1/40)λk-(3/40)λk.

The experiments were carried out in a following manner. As shown in FIG. 3, a conventional type of heating line 30 was formed on a rear window glass panel as a reference heating line, and a monopole antenna 16 was formed at a position spaced from the uppermost heating line by (¼)λk. It was assumed that the length of the monopole antenna 16 is (¼)λk and the width thereof is 10 mm or more.

An electric wave of 600 MHz was radiated toward a motor vehicle horizontally rotated around 360° in an anechoic chamber to measure the receiving sensitivity of the monopole antenna 16 at various directions for obtaining the sensitivities in all orientation, i.e., the directivity of the monopole antenna.

Based on measured results, a sensitivity in a desired direction, a sensitivity in a direction opposite to the desired direction, and an F/B ratio were calculated. Herein, the sensitivity in a desired direction means an average sensitivity in an angular range of 180° on a horizontal plane in a backward direction of the motor vehicle, and the sensitivity in a direction opposite to the desired direction means an average sensitivity in an angular range of 180° on a horizontal plane in a forward direction of the motor vehicle. The F/B ratio is a differential value between the sensitivity in the desired direction and the sensitivity in a direction opposite to the desired direction, which ratio may be obtained by the following formula.

F/B ratio (dB)=Sensitivity in a desired direction (dB)−Sensitivity in a direction opposite to the desired direction (dB).

Figure 4:
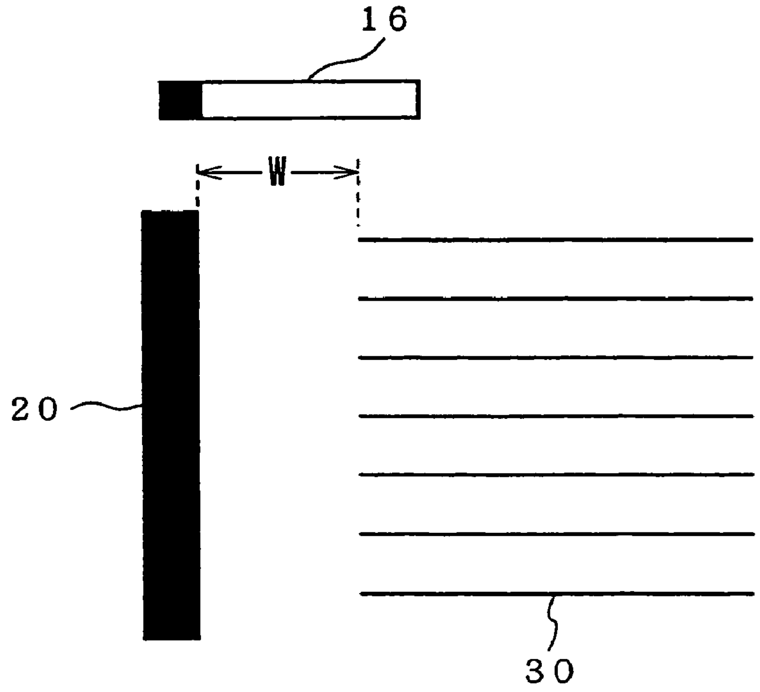
FIG. 4 shows the condition such that the heating line was kept apart from the bus bar.

Next, as shown in FIG. 4, heating lines 30 were kept apart from the bus bar 20 by a distance W, which distance was selected so as to be (⅛)λk, (¼)λk, (⅜)λk, (½)λk, (⅝)λk, respectively, and the receiving sensitivity was measured in an anechoic chamber. Based on measured results, the sensitivity in a desired direction, the sensitivity in a direction opposite to the desired direction, and F/B ratio were calculated. The measurement and calculation were carried out in the same method as that for the reference heating line. Measured results of sensitivities and calculated result of F/B ratio are shown in Table 1 in a differential mode with respect to the sensitivities and F/B ratio for the reference heating line.

TABLE 1

| | Sensitivity in a desired direction and F/B ratio (to a reference heating line) | |
|---|---|---|
| Lateral Dimension | Sensitivity in a desired direction | F/B ratio |
| 1/8λk | 1.3 | 1.0 |
| 1/4λk | 2.6 | 3.0 |
| 3/8λk | 3.8 | 5.1 |
| 1/2λk | 4.3 | 6.1 |
| 5/8λk | 4.5 | 6.2 |

(dB)

Figure 5:
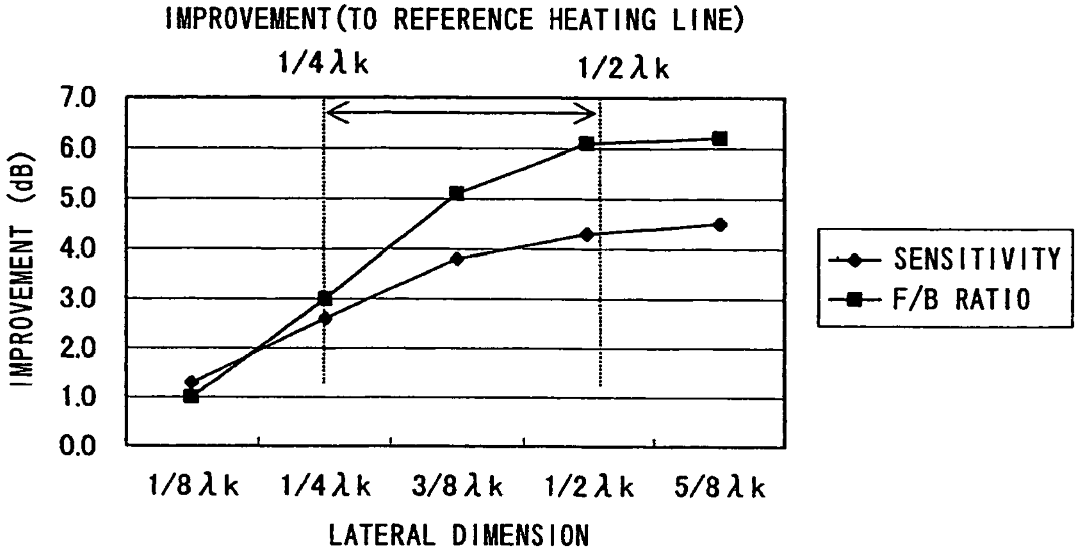
FIG. 5 shows a graph based on Table 1.

Referring to FIG. 5, there is shown a graph based on Table 1. It is appreciated that the sensitivity and F/B ratio is improved as the distance W is increased. However, if the distance W is significantly increased, then the defogging effect by the defogger is not realized in a area where there is no heating lines. As a result, it is preferable that the distance W is selected in the range of (¼)λk-(½)λk.

Referring to FIG. 2, the vertical dimension H and regular interval dimension D were varied with the lateral dimension W being fixed, and then the receiving sensitivity of the monopole antenna 16 was measured in an anechoic chamber where an electric wave of 600 MHz was radiated in order to realize a preferable meander shape. The sensitivity in a desired direction and F/B ratio were calculated based on measured results. These measurement and calculation were carried out in the same method as that for a reference heating line. In this case, the vertical dimension H was varied so as to be (3/40)λk, (6/40)λk, (9/40)λk, and (12/40)λk, and the regular interval dimension D so as to be (1/40)λk, (3/40)λk, and (5/40)λk, respectively. Measured results of sensitivities in a desired direction are shown in Table 2 in a differential mode with respect to the sensitivities for the reference heating line.

TABLE 2

| | Sensitivity in a desired direction (to a reference heating line) | | |
|---|---|---|---|
| | D | | |
| H | 1/40λk | 3/40λk | 5/40λk |
| 3/40λk | 1.0 | 1.3 | 1.4 |
| 6/40λk | 2.2 | 2.0 | 2.2 |
| 9/40λk | 2.6 | 2.6 | 1.8 |
| 12/40λk | 2.3 | 2.0 | 1.8 |

(dB)

Figure 6:
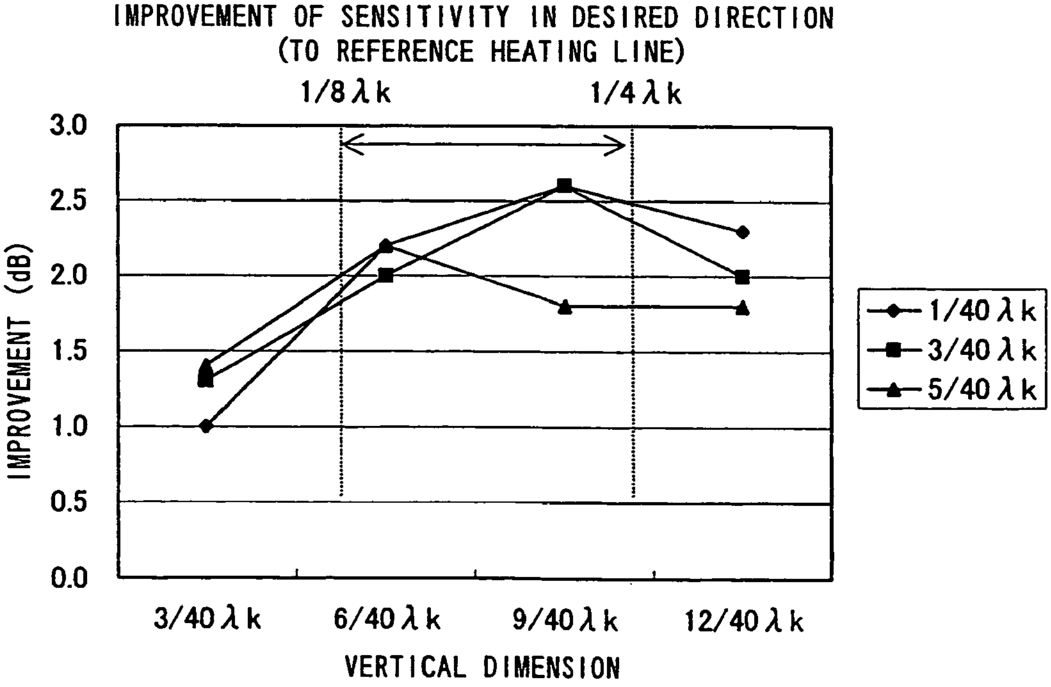
FIG. 6 shows a graph based on Table 2.

Referring to FIG. 6, there is shown a graph based on Table 2. In case of D=(5/40)λk, there is no improvement for the sensitivity. It is therefore appreciated that the range of (1/40) λk-(3/40)λk is preferable for the regular interval dimension D, and the range of (1/8)λk-(1/4)λk for the vertical dimension H.

Calculated F/B ratios are shown in Table 3 in a differential mode with respect to the F/B ratio for the reference heating line.

TABLE 3

| | F/B ratio (to a reference heating line) | | |
|---|---|---|---|
| | D | | |
| H | 1/40λk | 3/40λk | 5/40λk |
| 3/40λk | 0.6 | 0.5 | 0.6 |
| 6/40λk | 1.8 | 1.7 | 1.6 |
| 9/40λk | 2.0 | 1.6 | 1.1 |
| 12/40λk | 1.3 | 0.9 | 1.6 |

(dB)

Figure 7:
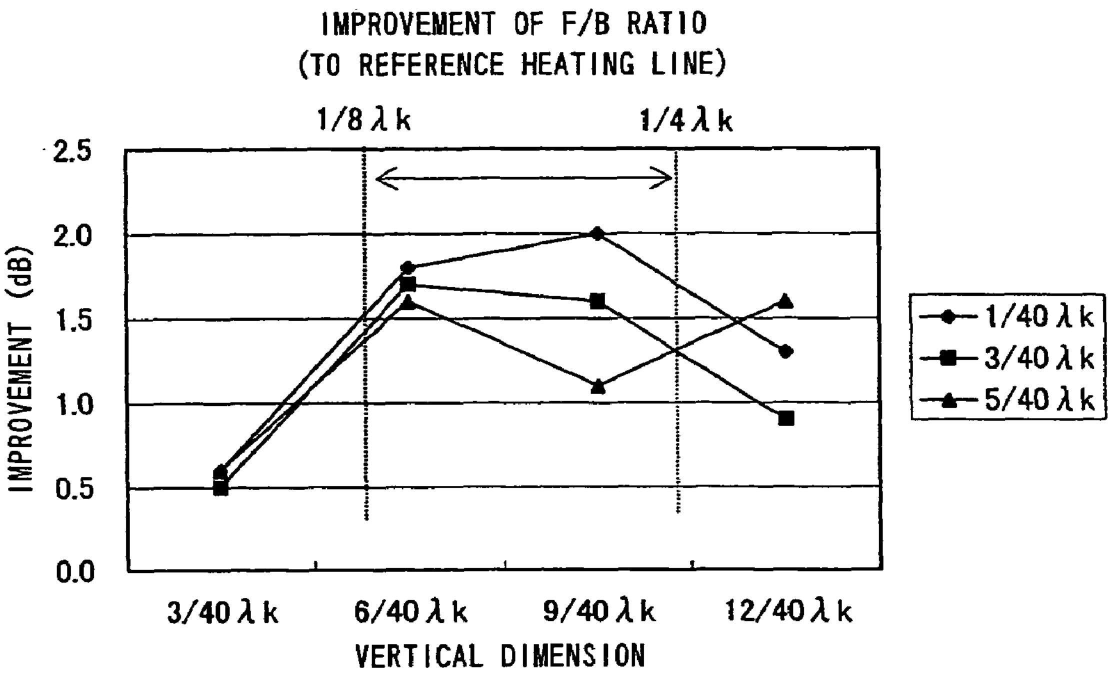
FIG. 7 shows a graph based on Table 3.

Referring to FIG. 7, there is shown a graph based on Table 3. In case of D=(5/40)λk, there is no improvement for the F/B ratio. It is therefore appreciated that the range of (1/40)λk-(3/40) λk is preferable for the regular interval dimension D, and the range of (1/8)λk-(1/4)λk for the vertical dimension H.

Depend on the above-described results, it is appreciated that the lateral dimension W of the meander-shaped heating line portion 22 is preferable in the range of (1/4)λk-(1/2)λk, the vertical dimension H in the range of (1/8)λk-(1/4)λk, and the regular interval dimension D in the range of (1/40)λk-(3/40)λk.

Embodiment 2

Figure 8:
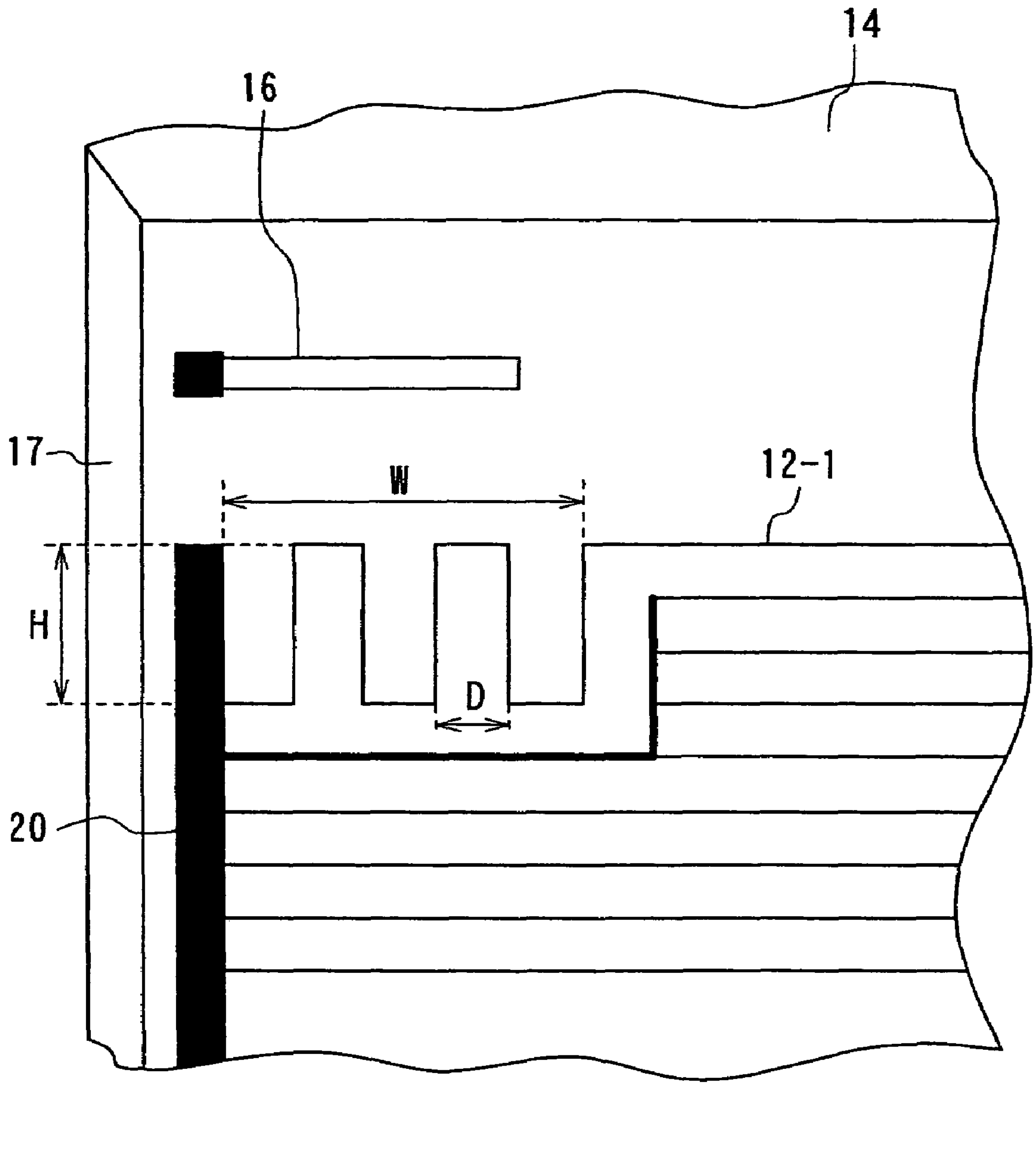
FIG. 8 shows an embodiment 2 of a heating line pattern structure which is a variant of that in FIG. 2.

Referring to FIG. 8, there is shown an example of a meander-shaped portion in which the meander-shaped portion shown in FIG. 2 is upside-down. While the heating line 12-1 of the meander-shaped portion is connected to the uppermost end of the bus bar 20 in FIG. 2, the heating line 12-1 of the meander-shaped portion is connected to the point which is lowered by the distance H from the uppermost end of the bus bar 20 in FIG. 8. The effect of this embodiment is the same as that in the meander-shaped portion in FIG. 2.

Embodiment 3

Figure 9:
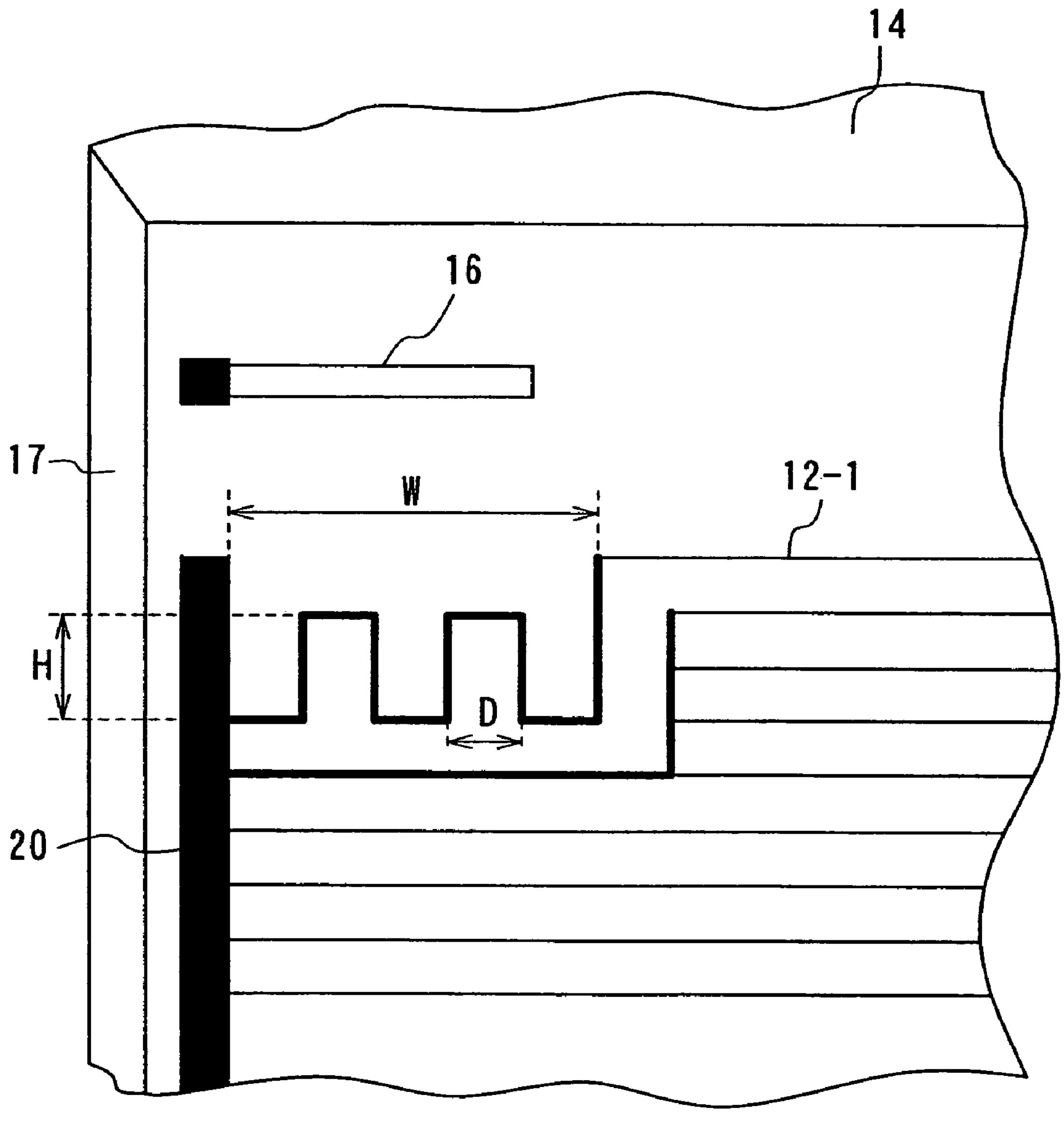
FIG. 9 shows an embodiment 3 of a heating line pattern structure which is another variant of that in FIG. 2.

Referring to FIG. 9, there is shown a variant of a meander-shaped portion. The variant is of the case that the vertical dimension H is (3/16)λk in the meander-shaped portion shown in FIG. 8. The effect of this embodiment is the same as that in the meander-shaped portion in FIG. 2.

Embodiment 4

Figure 10:
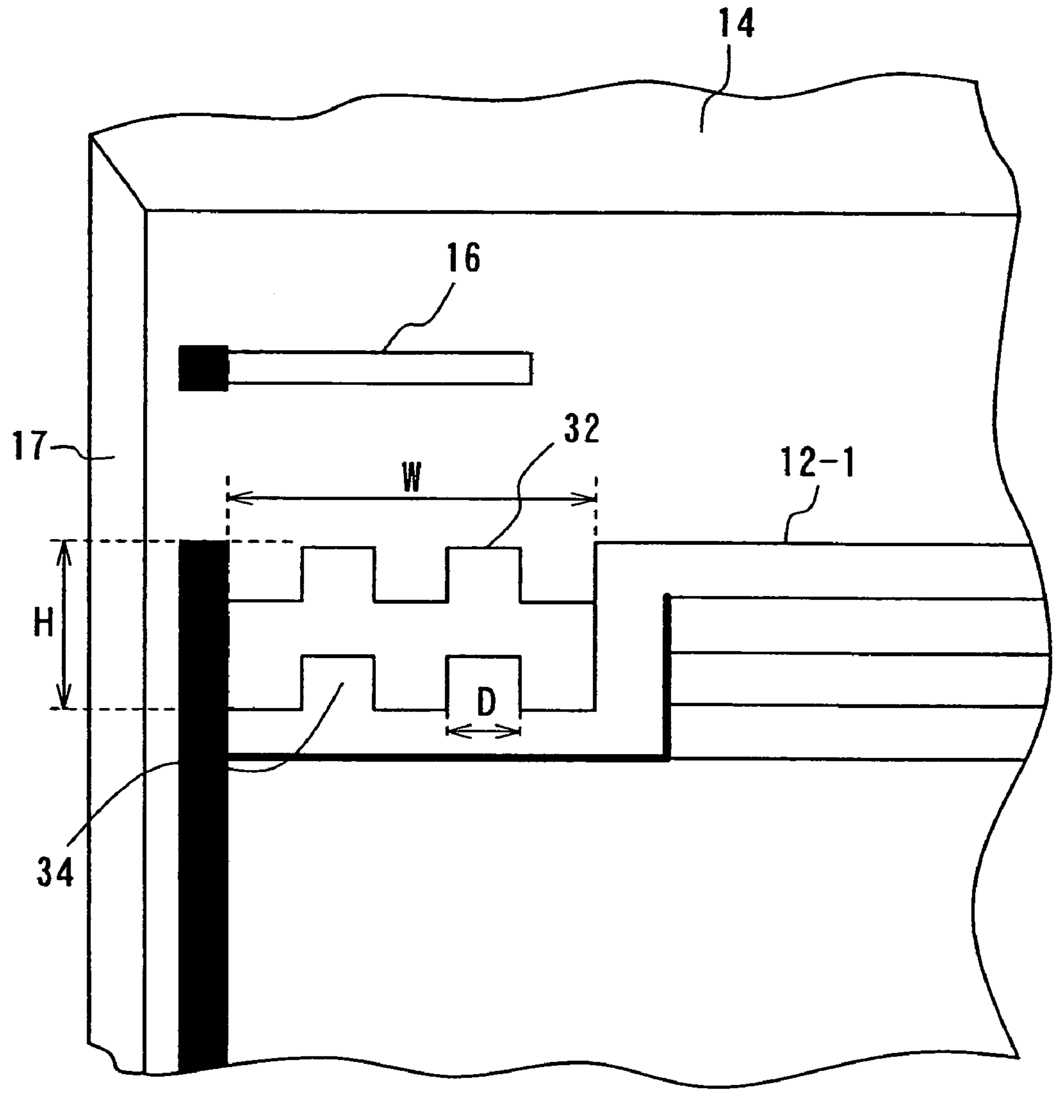
FIG. 10 shows an embodiment 4 of a heating line pattern portion structured by two meander-shaped heating lines.

Referring to FIG. 10, there is shown a meander-shaped portion structured by two meander-shaped heating lines 32 and 34, which is different from the meander-shaped portion structured by one meander-shaped heating line as shown in FIG. 2. It is preferable that the vertical dimension H, the lateral dimension W, and the regular interval dimension D are the same as that in FIG. 2. In this case, the length of respective zigzagged line 32 and 34 is approximately 2 W. The two zigzagged lines 32 and 34 are connected in parallel, so that the composite resistance thereof is equivalent to the resistance of a linear conductor having the lateral dimension of approximately W. Therefore, the width of respective meander-shaped heating line 33 and 34 may be the same as that of a conventional heating line.

Embodiment 5

Figure 11:
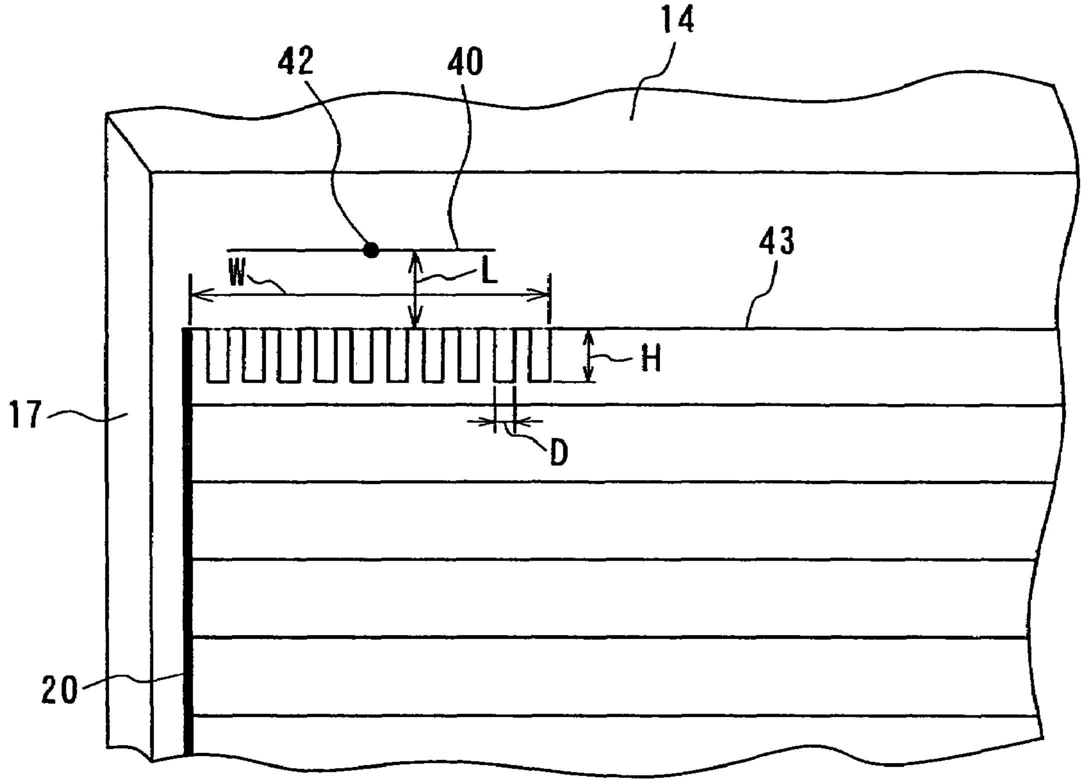
FIG. 11 shows an embodiment 5 of a heating line pattern structure in which an antenna is a dipole antenna.

While the antenna is a monopole antenna in the embodiments described above, a dipole antenna is used in the present embodiment. FIG. 11 shows a heating line pattern structure of the present embodiment. According to the structure, the portion of one heating line 43 in proximity to a dipole antenna 40, which portion is opposing to the dipole antenna 40, is structured in a meander-shaped manner.

The dipole antenna 40 has a total length of 18 cm, and the midpoint thereof is provided with a feeding point 42. The lateral dimension W of the meander-shaped portion is 24 cm, the vertical dimension H thereof 4.2 cm, and the regular interval dimension D thereof 1.2 cm.

Figure 12:
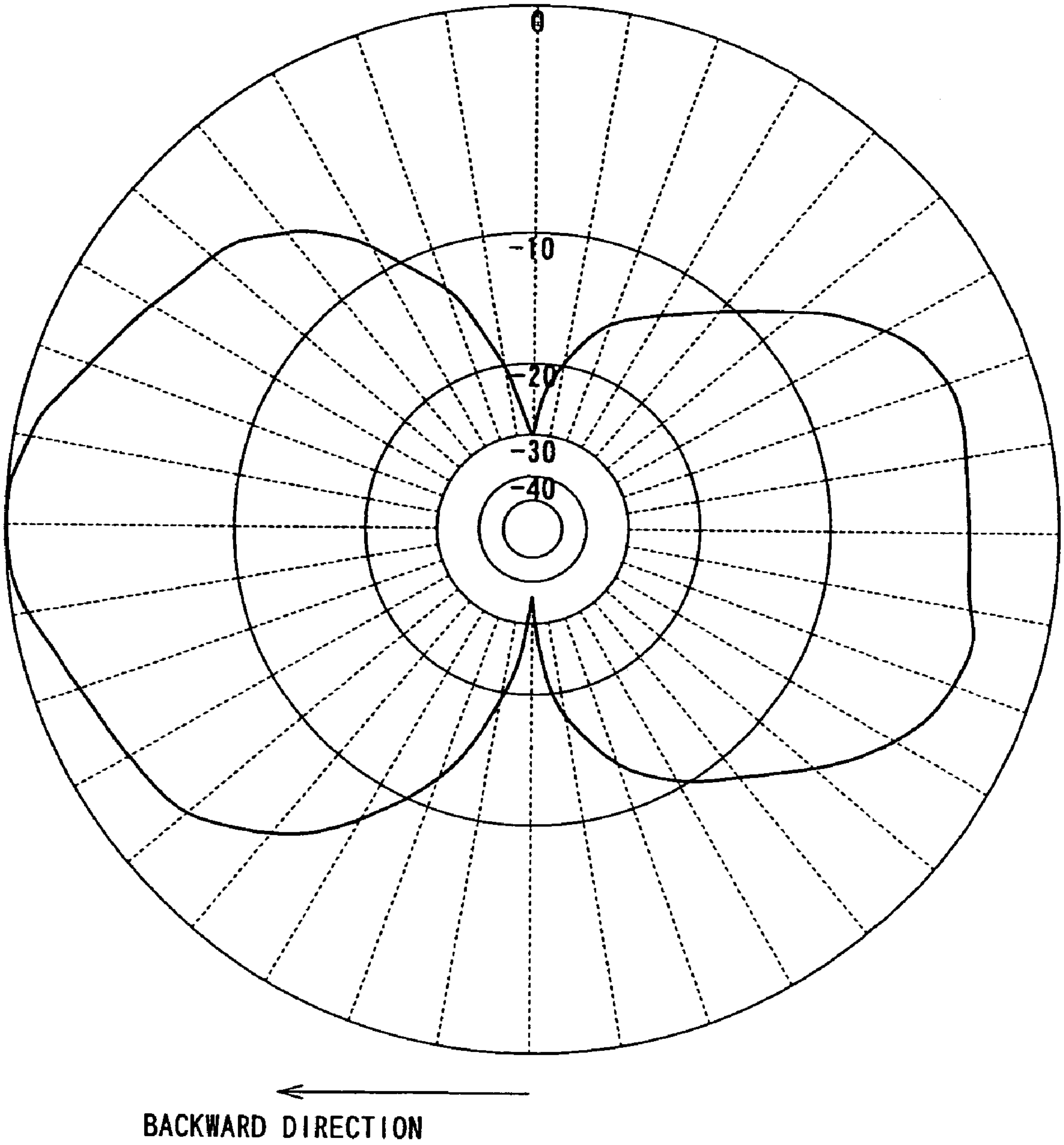
FIG. 12 shows the directivity of the antenna in the embodiment 5.

An electric wave of 500 MHz was radiated toward a motor vehicle horizontally rotated around 360° C. in an anechoic chamber to measure the receiving sensitivity of the dipole antenna 40 at various directions for obtaining the sensitivities in all orientation, i.e., the directivity of the dipole antenna. The measured directivity is shown in FIG. 12, from which it is understood that the directivity in a backward direction of a motor vehicle was improved.

Embodiment 6

In the present embodiment, the portion of one heating line in proximity to an antenna, which portion is opposing to the antenna, is made linear to function as a director.

Figure 13:
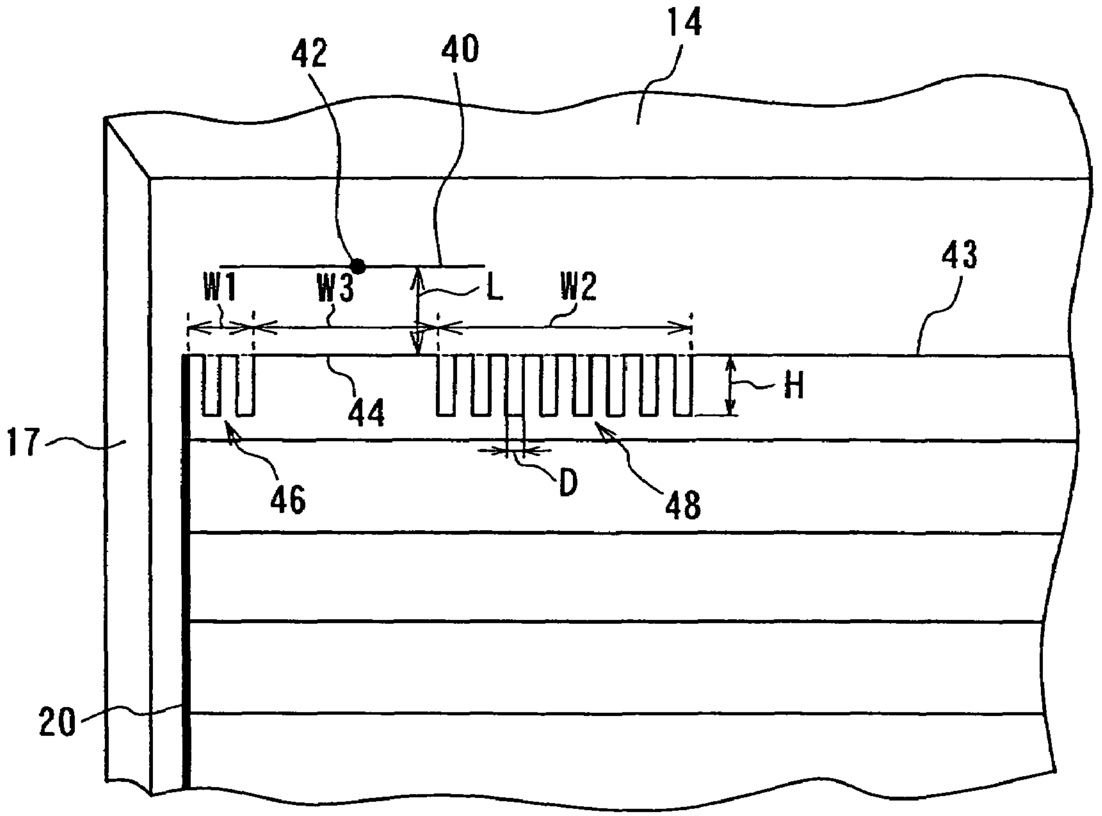
FIG. 13 shows an embodiment 6 of a heating line pattern structure in which a part of heating line is a director.

FIG. 13 shows a heating line pattern structure of the present embodiment, in which an antenna is a dipole antenna in the same manner as the embodiment 5. The dipole antenna 40 has a total length of 18 cm, and the midpoint thereof is provided with a feeding point 42. One heating line 43 in proximity to the dipole antenna 40 comprises a linear-shaped portion opposing to the dipole antenna 40 and meander-shaped portions 46 and 48 on both sides of the linear-shaped portion 44. The lateral dimension W1 of the meander-shaped portion 46 is 4.8 cm, the lateral dimension W2 of the meander-shaped portion 48 is 18 cm, and the length W3 of the linear-shaped portion 44 is 12 cm. The vertical dimension H of respective meander-shaped portions is 4.2 cm, and the regular interval dimension D thereof 1.2 cm.

Figure 14:
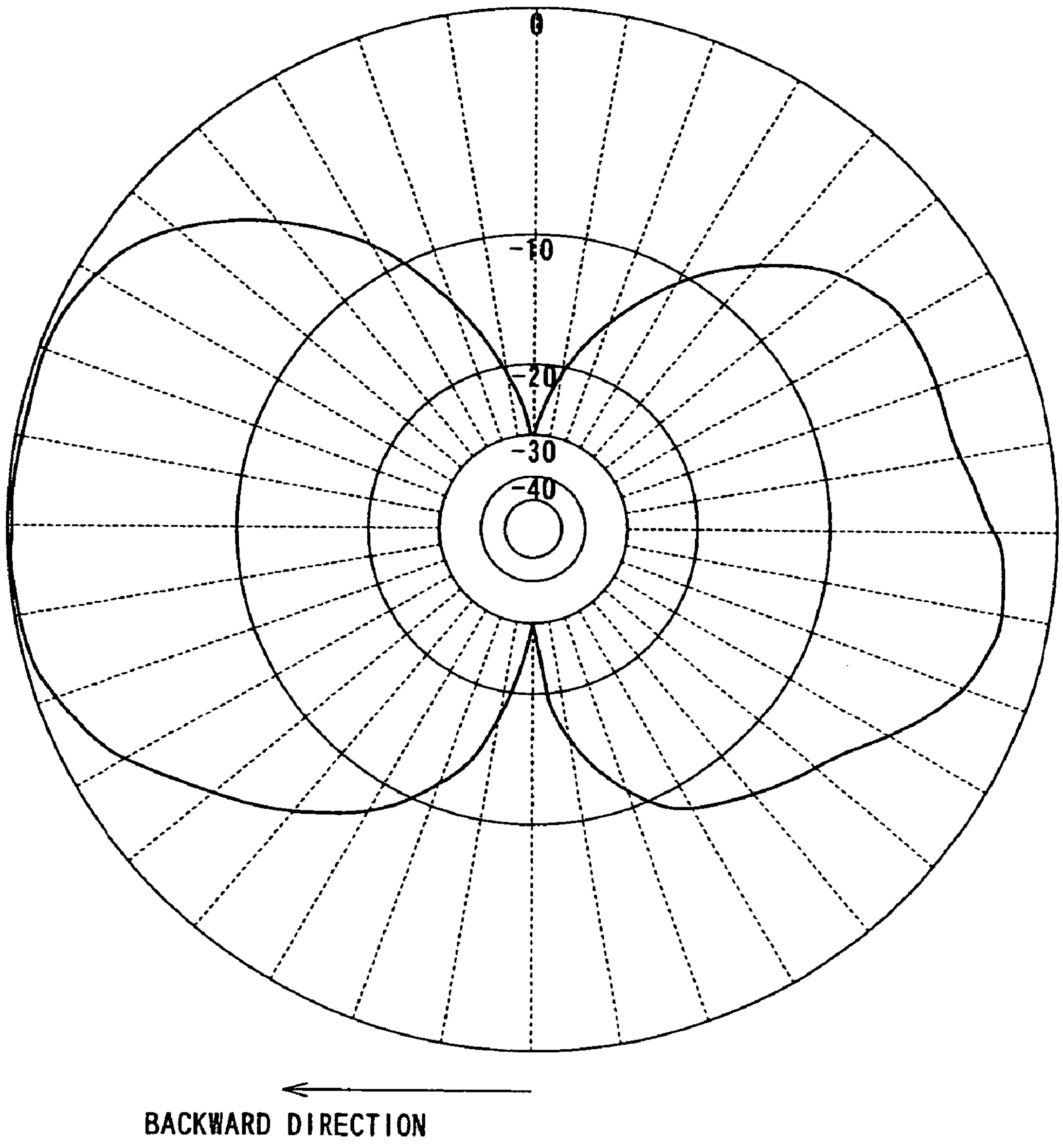
FIG. 14 shows the directivity of the antenna in the embodiment 6.

The directivity of the dipole antenna was measured in the same manner as the embodiment 5. FIG. 14 shows the measured directivity. It is appreciated that the directivity in a backward direction of a motor vehicle was improved. It is noted that the meander-shaped portion 46 may be omitted in the case that the antenna 40 is provided near the pillar 17 in the structure shown in FIG. 13.

Embodiment 7

Figure 15:
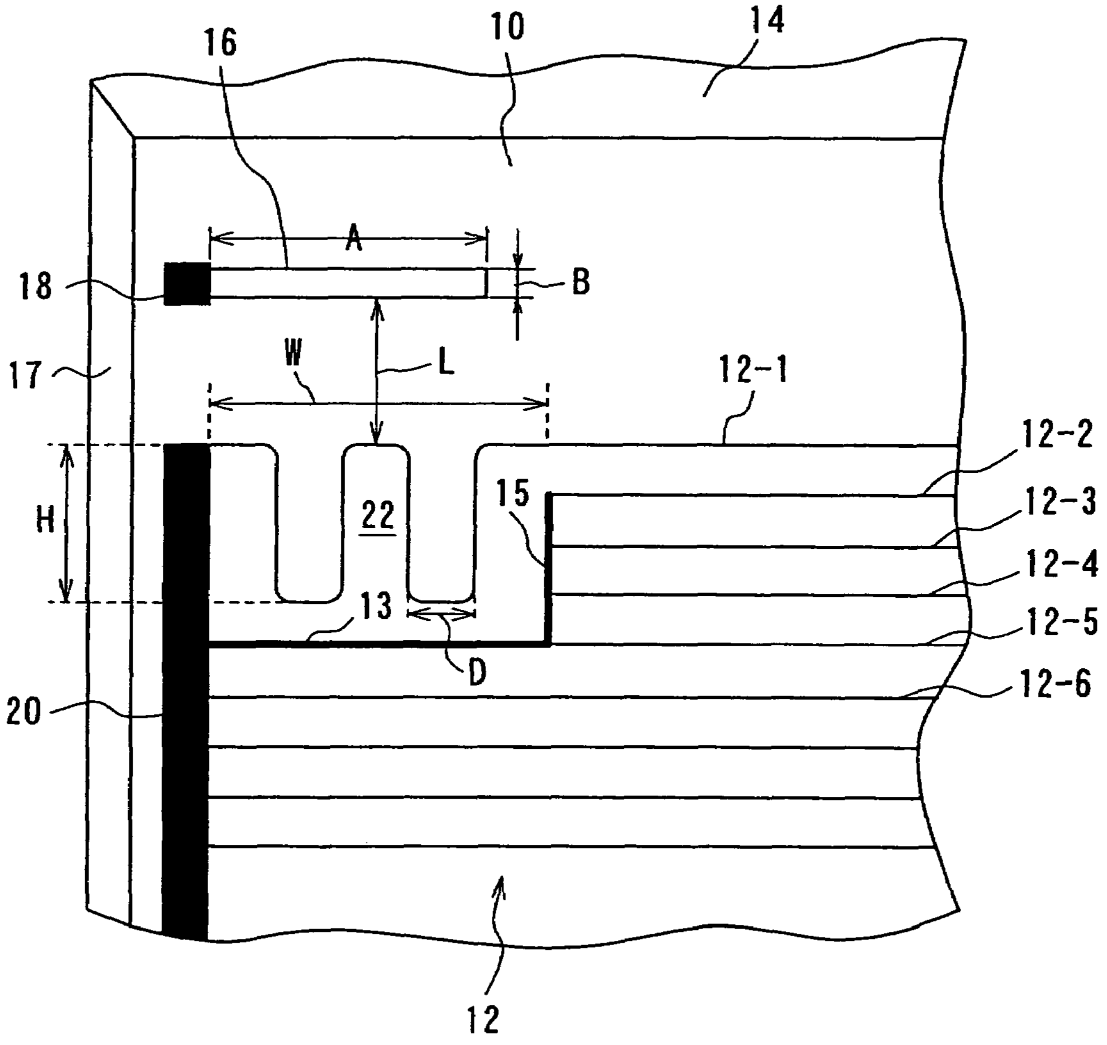
FIG. 15 shows a meander shaped heating line, the bent corner thereof is rounded.

In the respective embodiments described above, the meander shape of a heating line is selected to be a rectangularly folded shape, but it is not limited thereto. The bent corner of the heating line may be rounded, for example. Such a meander-shaped heating line portion is shown in FIG. 15, in which the bent corner of the meander-shaped heating line shown in FIG. 2 is rounded. Alternatively, a meander shape such as a sine wave may be utilized.

An antenna in the embodiments described above is for a terrestrial digital TV, although it is not limited thereto. It is clear that the present invention may be generally applied to an antenna for TV including an antenna for an analog TV, an antenna for FM, and the like.

INDUSTRIAL APPLICABILITY

In accordance with the present invention, the shape of a heating line in proximity to an antenna provided on a rear window glass panel is formed so that the effect of the heating line to the antenna is decreased. Therefore, the control of the directivity of the antenna toward a desired wave may be enabled.

The invention claimed is:

1. A heating line pattern structure of a defogger formed separate from and opposed to an antenna provided on a rear window glass panel of a motor vehicle, characterized in that at least one heating line in proximity to the antenna has a meander shape.

2. A heating line pattern structure of a defogger formed opposing to an antenna provided on a rear window glass panel of a motor vehicle, characterized in that at least one heating line in proximity to the antenna has a meander shape, wherein:

the antenna is an antenna for a digital TV, λ being a wavelength of a received wave by the antenna for the digital TV and k being a wavelength shortening factor, the vertical dimension of the portion of the at least one heating line having a meander shape is in the range of $(1/8)\lambda k$-$(1/4)\lambda k$, the lateral dimension of the portion of the at least one heating line having a meander shape is in the range of $(1/4)\lambda k$-$(1/2)\lambda k$, and the lateral dimension of regular interval in the portion of the at least one heating line having a meander shape is in the range of $(1/40)\lambda k$-$(3/40)\lambda k$.

3. A heating line structure according to claim 2, wherein the portion of the heating line having a meander shape is opposed to the antenna.

4. A heating line structure according to claim 3, wherein the heating line having a meander shape is folded in vertical and lateral directions at regular intervals, respectively.

5. A heating line structure according to claim 3, wherein one end of the heating line having a meander shape is directly connected to a bus bar of the defogger, and the other end of the heating line having a meander shape is connected to a first one heating line extending laterally.

6. A heating line structure according to claim 3, wherein the antenna is a monopole antenna.

7. A heating line structure according to claim 6, wherein the at least one heating line consists of one heating line.

8. A heating line structure according to claim 5, wherein the width of the one heating line having a meander shape is larger than that of the first one heating line.

9. A heating line structure according to claim 2, wherein the at least one heating line consists of two heating lines.

10. A heating line structure according to claim 7 or 9, wherein:

a second one heating line extends laterally under the meander-shaped heating line portion, one end of the second one heating line is connected to the bus bar and the other end thereof to one vertical heating line, and a plurality of third lateral heating lines are connected to the one vertical heating line.

11. A heating line structure according to claim 10, wherein the width of each of the second one heating line and the one vertical heating line is larger than that of each of the third lateral heating lines.

12. A heating line structure according to claim 2, wherein the at least one heating line comprise a linear-shaped portion opposing to the antenna and meander-shaped portion on one or both side(s) of the linear-shaped portion.

13. A rear window glass panel of a motor vehicle comprising:

an antenna provided on the rear window glass panel; and a defogger formed on the rear window glass panel opposing to the antenna, the defogger including the heating line pattern structure of claim 2.

14. A rear window glass panel according to claim 13, wherein the antenna is a monopole antenna or dipole antenna having a feeding point on the rear window glass panel near to a pillar or roof of a body of the motor vehicle.

* * * * *